(12) United States Patent
Amler et al.

(10) Patent No.: US 12,214,812 B2
(45) Date of Patent: Feb. 4, 2025

(54) VEHICLE

(71) Applicant: Siemens Mobility GmbH, Munich (DE)

(72) Inventors: Gerald Amler, Nuremberg (DE); Wolfgang Kluth, Altdorf (DE); Stefan Reinicke, Ilmmuenster (DE); Dieter Schiefer, Weisendorf (DE)

(73) Assignee: Siemens Mobility GmbH, Munich (DE)

( * ) Notice: Subject to any disclaimer, the term of this patent is extended or adjusted under 35 U.S.C. 154(b) by 891 days.

(21) Appl. No.: 17/418,939

(22) PCT Filed: Nov. 28, 2019

(86) PCT No.: PCT/EP2019/082823
§ 371 (c)(1),
(2) Date: Jun. 28, 2021

(87) PCT Pub. No.: WO2020/135966
PCT Pub. Date: Jul. 2, 2020

(65) Prior Publication Data
US 2022/0119019 A1    Apr. 21, 2022

(30) Foreign Application Priority Data
Dec. 28, 2018 (DE) .......................... 102018251776.2

(51) Int. Cl.
*B61L 15/00* (2006.01)
*B60L 3/00* (2019.01)
(Continued)

(52) U.S. Cl.
CPC ......... *B61L 15/0058* (2024.01); *B60L 3/0076* (2013.01); *B60L 3/12* (2013.01);
(Continued)

(58) Field of Classification Search
CPC .... B61L 15/0058; B60L 3/12; B60L 15/2009; B60L 2200/26; B60L 2240/427;
(Continued)

(56) References Cited

U.S. PATENT DOCUMENTS

| 10,471,940 B2 | 11/2019 | Mauder et al. |
| 10,703,395 B2 | 7/2020 | Streiff et al. |
| 2019/0092187 A1* | 3/2019 | Yoshizawa .......... B60L 15/2009 |

FOREIGN PATENT DOCUMENTS

| DE | 102006051317 A1 | 5/2008 |
| DE | 102006051318 A1 | 5/2008 |
(Continued)

*Primary Examiner* — Jacob M Amick
(74) *Attorney, Agent, or Firm* — Laurence A. Greenberg; Werner H. Stemer; Ralph E. Locher

(57) ABSTRACT

A vehicle, in particular to a rail vehicle, has at least one drive motor and a brake control device. A monitoring device measures, in the braking mode of the vehicle, at least one drive current which flows through the drive motor, and at least one drive voltage which is applied to the drive motor, to form measured values, and to generate operational information which specifies the mode of operation of the drive motor, in particular braking information which specifies a braking effect of the drive motor, on the basis of the measured values.

20 Claims, 4 Drawing Sheets

(51) Int. Cl.
  *B60L 3/12*   (2006.01)
  *B60L 15/20*  (2006.01)
  *B60T 13/66*  (2006.01)
  *B60T 17/22*  (2006.01)

(52) U.S. Cl.
  CPC ........ *B60L 15/2009* (2013.01); *B60T 13/662* (2013.01); *B60T 13/665* (2013.01); *B60T 17/228* (2013.01); *B60L 2200/26* (2013.01); *B60L 2240/427* (2013.01)

(58) Field of Classification Search
  CPC .... B60L 3/0076; B60T 13/662; B60T 13/665; B60T 17/228
  See application file for complete search history.

(56) References Cited

FOREIGN PATENT DOCUMENTS

| | | |
|---|---|---|
| DE | 102014217431 A1 | 3/2016 |
| DE | 102016108998 A1 | 11/2017 |
| WO | WO 2016134964 A1 | 9/2016 |
| WO | WO 2017093224 A1 | 6/2017 |

\* cited by examiner

VEHICLE

BACKGROUND OF THE INVENTION

Field of the Invention

The invention relates to a vehicle, in particular a rail vehicle, with at least one drive motor and a brake control device.

A vehicle of this kind is known from the international patent application WO 2016/134964 A1. In the known vehicle, in addition to a drive control device, a monitoring device is present, which operates independently of the drive control device and switches off the drive if a drive switch-off condition is met and, at the same time, an active driving mode of the drive is determined. The driving mode is determined by measuring and evaluating a direct current in a direct current intermediate circuit of a power converter upstream of the drive.

SUMMARY OF THE INVENTION

The invention is based on the object of further improving a vehicle of the above-described type in respect of the mode of operation of the braking system.

This object is inventively achieved by a vehicle with the features of claim 1 as claimed. Advantageous embodiments of the inventive vehicle are disclosed in the dependent claims.

Accordingly it is inventively provided that a monitoring device is designed to measure, in the braking mode of the vehicle, to measure at least one drive current flowing through the drive motor, and at least one drive voltage applied to the drive motor, to form measurement values, and to generate operational information specifying the mode of operation of the drive motor, in particular braking information specifying the braking effect of the drive motor, on the basis of the measurement values.

A fundamental advantage of the inventive vehicle can be seen in that, in contrast to the vehicle mentioned in the introduction, the drive current flowing through the drive motor and the drive voltage applied to the drive motor are measured directly for determination of the mode of operation of the drive motor and not indirect measured variables, which are based solely on an upstream direct current intermediate circuit and therefore provide only indirect information about the actual behavior of the drive. Possible faults inside the power converter therefore cannot have any effect on the determined operational information and the reliability of the operational information determined, preferably calculated, with the measurement values is particularly great.

A further fundamental advantage of the inventive vehicle consists in that a particularly low-inductance arrangement of the components—in particular with regard to a power converter upstream of the drive motor—is possible, since current sensors and voltage sensors do not have to be integrated in the direct voltage intermediate circuit of the power converter but can be downstream thereof.

A drive control device, connected to the drive motor, preferably by an upstream power converter, is preferably present for actuation of the drive motor. When a braking command is present, in particular an emergency braking command, the drive control device actuates the drive motor, for example by way of a power converter, preferably in such a way that the drive motor operates in the braking mode and forms an electrodynamic brake. The operational information generated by the monitoring device thereby forms, in the braking mode, braking information of the drive motor and thereby braking information of the electrodynamic brake formed by the motor.

The sign of the braking information can indicate, for example, whether the drive motor is actually in the braking mode or—in the case of a braking command, in particular an emergency braking command—is erroneously in the driving mode.

It is advantageous if the vehicle has a friction-based brake and the brake control device is suitable for actuating the friction-based brake. The brake control device is preferably designed to actuate the friction-based brake by taking into account the braking information of the monitoring device. In an embodiment of this kind, braking of the vehicle can be reliably controlled using the friction-based brake as well as taking into account the respective braking effect of the drive motor. For example, in the case of an emergency situation or when an emergency braking command is present, both the drive motor as an electrodynamic brake as well as the friction-based brake can be used for braking the vehicle.

The brake control device is preferably designed to determine the required braking effect of the friction-based brake by calculating the difference between a predefined desired braking value and the braking information of the monitoring device and to generate a control signal for the friction-based brake on the basis of the determined required braking effect of the friction-based brake. The friction-based brake is preferably an electropneumatic brake.

The desired braking value is preferably determined by the brake control device as a function of the speed of a wheel set to be braked with the friction-based brake, the speed of the vehicle and/or the mass of the vehicle.

The friction-based brake can preferably be continuously actuated and/or generates braking force preferably continuously. A continuously operating friction-based brake enables optimum adjusting of the desired braking value, so, for example in the case of an emergency braking command, a minimum braking distance is achieved and over-braking of individual or several wheel sets of the vehicle is prevented.

The at least one drive motor is preferably a two- or multi-phase drive motor.

The monitoring device comprises per phase preferably a current sensor for measurement of the phase current flowing through the drive motor to form a current measurement value and per phase a voltage sensor for measurement of a phase voltage applied to the drive motor to form a voltage measurement value.

It is advantageous if the at least one drive motor is a three-phase drive motor and the monitoring device comprises three current sensors for measurement of three current measurement values and three voltage sensors for measurement of three voltage measurement values.

It is particularly advantageous if the monitoring device adds up the current measurement values to form a current total and/or the voltage measurement values to form a voltage total.

In the last-mentioned embodiment, the monitoring device preferably generates a fault signal if the value of the current total exceeds a current-based threshold value and/or the value of the voltage total exceeds a voltage-based threshold value.

The brake control device is preferably designed to actuate, in the braking mode of the vehicle and in the presence of the fault signal, the friction-based brake without taking into account the braking information, in other words, as if the drive motor were inactive in terms of braking.

It is also advantageous if the monitoring device is designed, in the braking mode, in particular when an emergency braking command is present, to switch off the drive current if the drive current flowing through the drive motor and the drive voltage applied to the drive motor indicate a driving mode of the drive. A driving mode can be indicated, for example, by a different sign in the braking information of the monitoring device than the braking mode.

The vehicle preferably also has a drive control device and a power converter downstream of the drive control device and actuated thereby, which supplies the drive motor with driving energy in the driving mode and removes braking energy from the drive motor in the braking mode of the drive motor.

Arranged between an energy supply and the power converter is preferably a switch, which in the switched-on state connects the energy supply and the power converter and in the switched-off state separates them from each other. The monitoring device preferably switches off the switch if, in the braking mode of the vehicle, the fault signal is present and/or the measurement values indicate, in the presence of an emergency braking command, an active driving mode of the drive motor.

The brake control device is preferably connected to the drive control device and preferably processes braking information determined thereby in addition to the braking information of the monitoring device.

The invention is based, moreover, on a method for braking a vehicle, in particular a rail vehicle, which has at least one drive motor and at least one brake control device.

It is inventively provided that in the braking mode of the vehicle, at least one drive current flowing through the drive motor and at least one drive voltage applied to the drive motor is measured to form measurement values and operational information specifying the mode of operation of the drive motor, in particular in the form of braking information specifying the braking effect of the drive motor, is generated on the basis of the measurement values.

Reference should be made in respect of the advantages of the inventive method to the above statements in connection with the inventive vehicle.

Preferably, a friction-based brake is actuated by taking into account the braking information.

The required braking effect of the friction-based brake is preferably determined by calculating the difference between a predefined desired braking value and the braking information. The friction-based brake is preferably an electropneumatic brake, which can be continuously actuated and/or with which continuous braking force is generated.

The drive motor is preferably actuated with a drive control device, which, in the presence of a braking command, in particular an emergency braking command, actuates the drive motor, for example via a power converter, in such a way that the drive motor operates in the braking mode and forms an electrodynamic brake.

The invention will be explained in more detail below with reference to exemplary embodiments. In the drawings, by way of example:

BRIEF DESCRIPTION OF THE SEVERAL VIEWS OF THE DRAWING

For the sake of clarity, the same reference characters are consistently used in the figures for identical or comparable components.

DETAILED DESCRIPTION OF THE INVENTION

Figure 1:
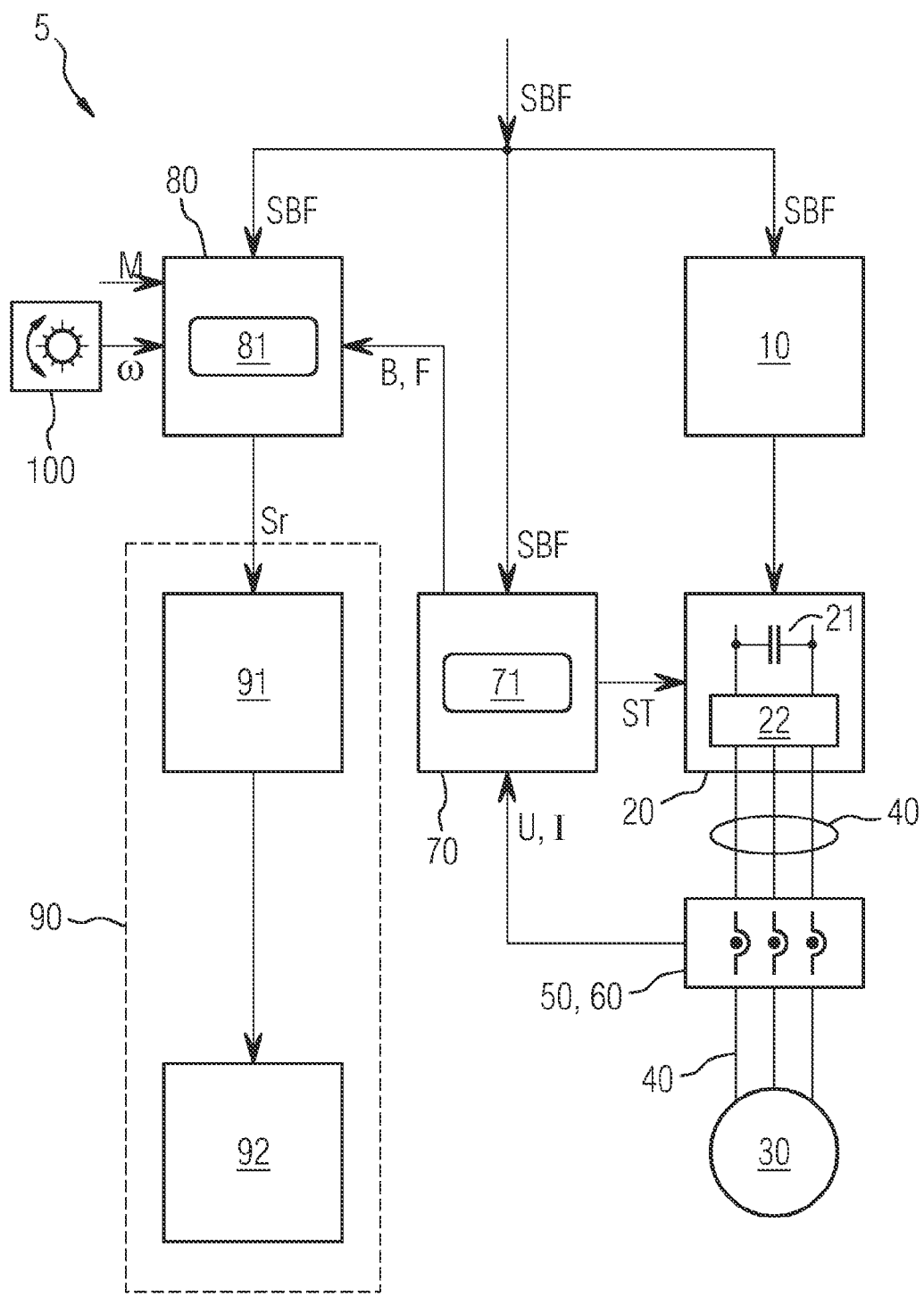
FIG. 1 shows components of an exemplary embodiment for an inventive rail vehicle, which is equipped with an electrodynamic brake and a friction-based brake.

FIG. 1 shows components of a rail vehicle 5 in a schematic representation. A drive control device 10, which is connected by a power converter 20 to a drive motor 30 of the rail vehicle 5, can be seen.

The connection between the power converter 20 and the drive motor 30 comprises supply lines, which are identified in FIG. 1 by the reference character 40. In the exemplary embodiment according to FIG. 1, the drive motor 30 has a three-phase design and is accordingly connected by three supply lines 40 to the power converter 20.

The power converter 20 has a direct voltage intermediate circuit 21 with an inverter 22 downstream thereof at the output side. The inverter 22 generates the drive current and the control voltage at the output side in three phases for the drive motor 30 and feeds them into the supply lines 40.

The input-side feed or the input-side energy supply of the direct voltage intermediate circuit 21 is not shown in detail in FIG. 1; it can occur via a rectifier (not shown) in the case of an alternating voltage supply of the power converter 20 or indirectly by way of a direct voltage feed.

Current sensors 50 and voltage sensors 60 are connected to the supply lines 40, with which the monitoring device 70 measures current values I and voltage measurement values U. The monitoring device 70 is connected at the output side to a brake control device 80, which is designed for actuation of a friction-based, preferably electropneumatic, brake 90 of the rail vehicle 5. The current sensors 50 and the voltage sensors 60 can be components of the monitoring device 70.

The friction-based brake 90 comprises a control unit 91, which is preferably electropneumatically configured or is an electropneumatic control unit, and a downstream brake mechanism 92, which acts on a wheel set (not shown) of the rail vehicle 5.

At the input side the brake control device 80 is connected, moreover, to a speed sensor 100, which measures the respective speed ω of the wheel set to be braked by the friction-based brake 90 or a different wheel set of the rail vehicle 5 and feeds a corresponding speed value into the brake control device 80.

For the case where an emergency braking command SBF is present, the components, shown in FIG. 1, of the rail vehicle 5 are preferably operated as follows:

In the presence of the emergency braking command SBF, the drive control device 10 will actuate the power converter 20 in such a way that the drive motor 30 operates in the braking mode and forms an electromagnetic brake. The drive currents flowing through the drive motor 30 and the drive voltages applied to the drive motor 30 are measured and evaluated by the monitoring device 70 with the current sensors 50 and the voltage sensors 60 to form the current measurement values I and the voltage measurement values U.

The monitoring device 70 preferably has a computing device 71, which is suitable for calculating braking information B on the basis of the current measurement values I and the voltage measurement values U, which information indicates the respective braking effect of the drive motor 30. The braking information B is transferred to the downstream brake control device 80.

The brake control device 80 has, for example, a computing device 81, which is designed in such a way that it checks whether the braking effect of the drive motor 30, quantified by the braking information B of the monitoring device 70, is adequate or not. If this is not the case, by calculating the difference between a predefined braking value Bsoll and the respective braking information B of the monitoring device 70, the brake control device 80 calculates the required additional braking effect Bz, which the friction-based brake 90 also has to generate in order to brake the rail vehicle 5 or the wheel set to be braked with the predefined desired braking value Bsoll:

$$Bz = Bsoll - B$$

A control signal specifying the required additional braking effect Bz for the friction-based brake 90 is represented in FIG. 1 by the reference character Sr. In the presence of the control signal Sr the electropneumatic control unit 91 will accordingly actuate the pneumatically operating brake mechanism 92 of the friction-based brake 90, so that the wheel set to be braked alternatively generates the required additional braking effect Bz, which the drive motor 30 does not supply.

The friction-based brake 90 and its electropneumatic control unit 91 respectively are preferably designed in such a way that the friction-based brake 90 can operate continuously and can exert a continuous braking effect on the wheel set to be braked.

For determination of the desired braking value Bsoll, the brake control device 80 can use a load signal M, which quantifies the respective weight or the respective mass of the rail vehicle 5. The desired braking value Bsoll is therefore determined in such a case preferably using the speed ω of the speed sensor 100 and of the load signal M.

The monitoring device 70 or its computing device 71 is preferably configured, moreover, in such a way that it adds up the current measurement values I and the voltage measurement values U to form a current sum Isum and a voltage sum Usum. The monitoring device 70 preferably generates a fault signal F if the value of the current sum Isum exceeds a current-based threshold value Imax and/or the value of the voltage sum Usum exceeds a voltage-based threshold value Umax.

$$|I_{sum}| = |\Sigma_{i=1}^{3} I_i| > I_{max} \Rightarrow \text{generation of the fault signal } F$$

$$|U_{sum}| = |\Sigma_{i=1}^{3} U_i| > U_{max} \Rightarrow \text{generation of the fault signal } F$$

where Ii (i=1, . . . , 3) designates the phase currents in the three supply lines 40 and Ui designates the phase voltages at the three supply lines 40.

If such a fault signal F is present on the part of the monitoring device 70, the brake control device 80 will preferably perform the braking mode of the rail vehicle 5 or the actuation of the friction-based brake 90 as if the drive motor 30 were inactive in terms of braking.

Furthermore, it is advantageous if the monitoring device 70 evaluates the current measurement values I and the voltage measurement values U—in particular by taking into account the respective sign of current and voltage—for whether, in the case of an emergency braking command SBF, the drive motor 30 actually operates as an electrodynamic brake and does not continue to be operated due to a fault. If the monitoring device 70 determines on the basis of the current measurement values I and the voltage measurement values U that the drive motor 30 is operating as a drive and not as an electric brake despite the presence of the emergency braking command SBF, the monitoring device 70 will preferably deactivate the drive motor 30 by switching off the power converter 20 by means of a switch-off signal ST and therefore stopping a feed to the drive motor 30.

Figure 2:
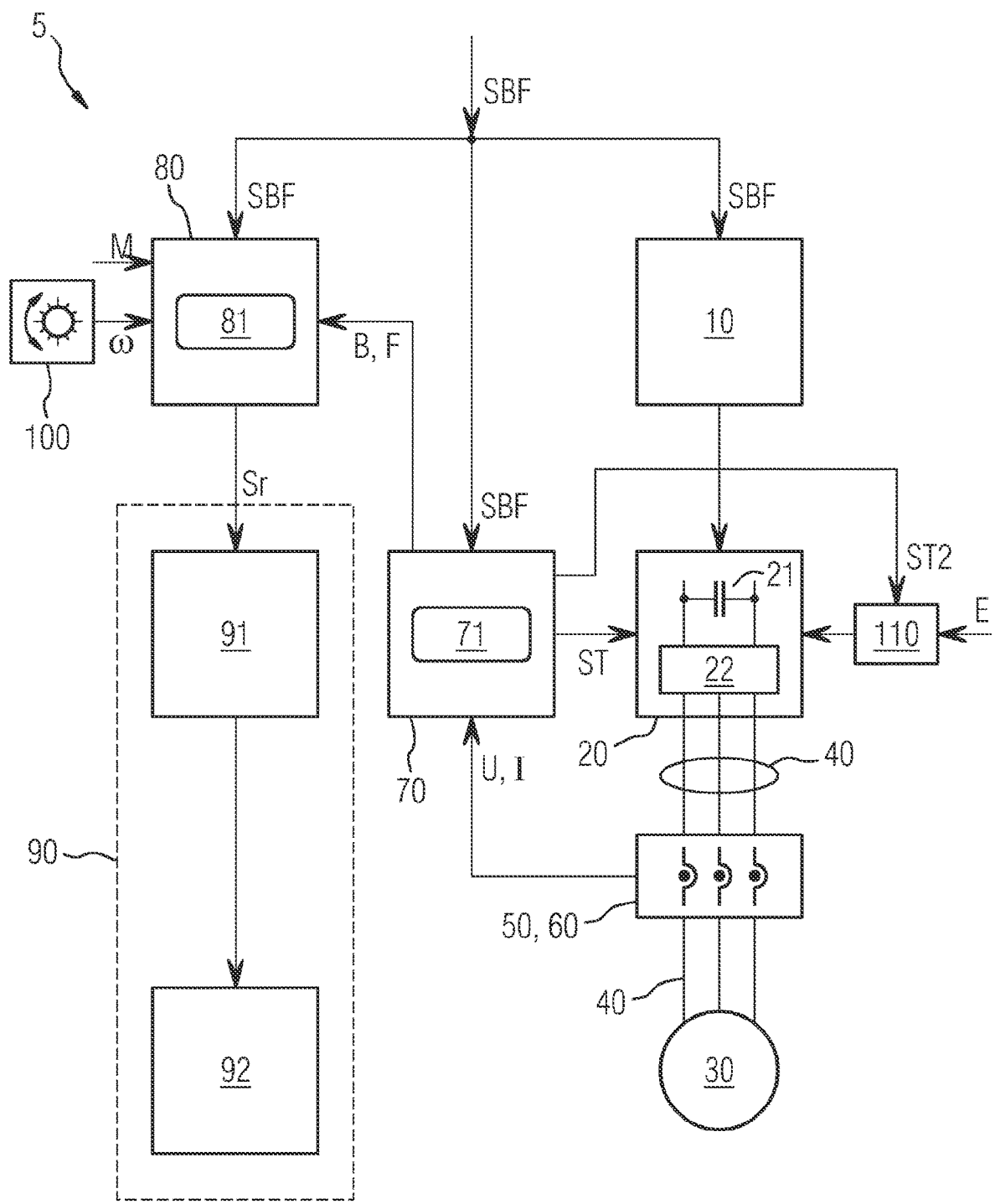
FIG. 2 shows components of an exemplary embodiment for an inventive rail vehicle in which there is also a switch, which can be switched off by a monitoring device, for switching off the energy supply of the power converter.

FIG. 2 shows a variant of the exemplary embodiment according to FIG. 1. In the variant according to FIG. 2, a switch 110 is arranged between an energy supply E and the power converter 20 and can be actuated by the monitoring device 70. The monitoring device 70 or its computing device 71 has the option of stopping the supply of the power converter 20 with energy and therefore preventing the driving effect of the drive motor 30.

An activation or a switching-off of the switch 110 by means of a switch-off signal ST2 preferably takes place when, in the presence of an emergency braking command SBF, the computing device determines that the drive motor 30 is not operating as an electrodynamic brake but is continuing to operate in the driving mode. In the exemplary embodiment according to FIG. 2, switching-off of the drive motor 30 can be induced by both the switch-off signal ST, which acts on the power converter 20, as well as by the switch-off signal ST2, which acts on the switch 110.

Figure 3:
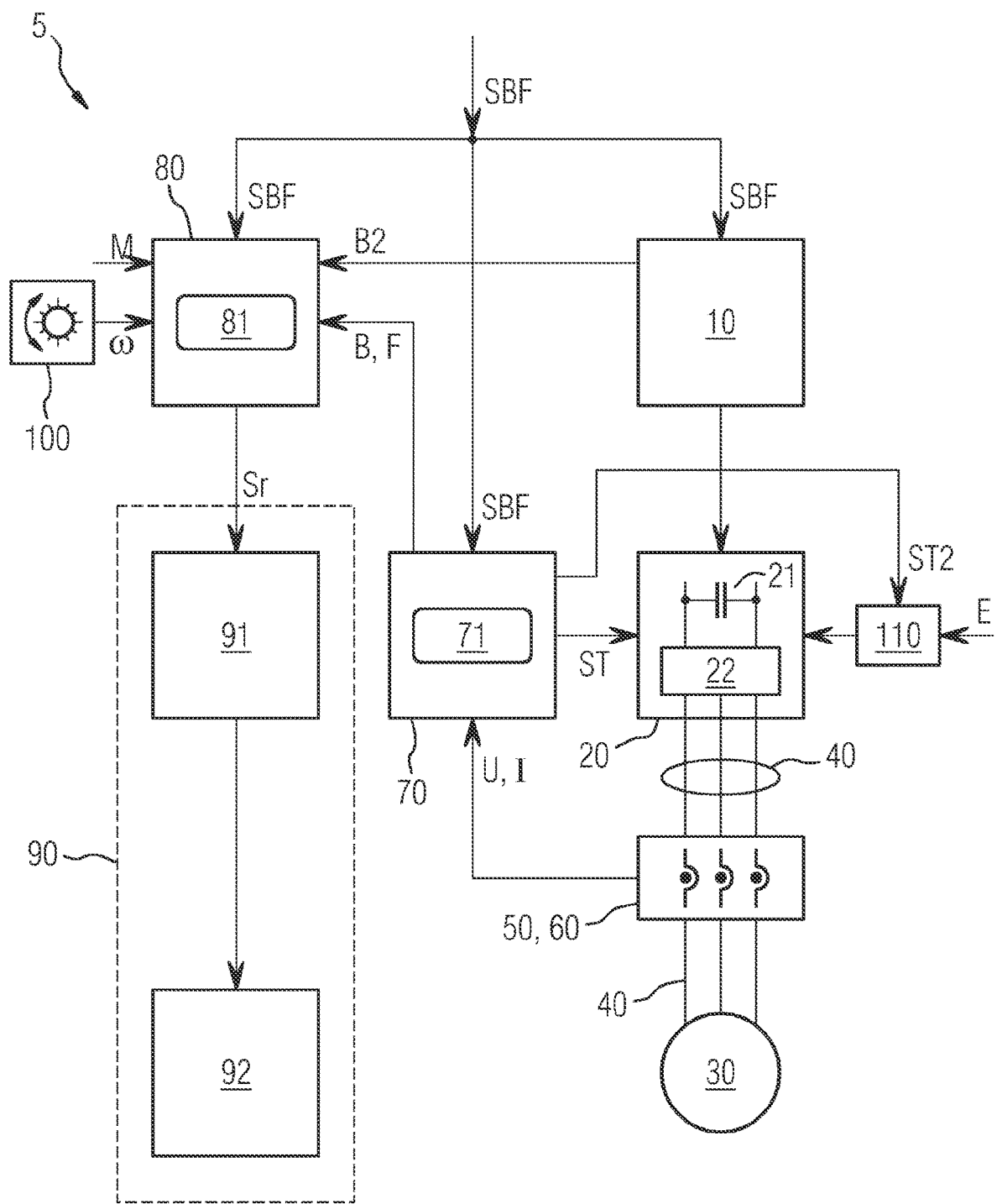
FIG. 3 shows components of an exemplary embodiment for an inventive rail vehicle in which a drive control device, in the presence of an emergency braking command, transfers braking information specifying the braking effects of the drive motor to a brake control device actuating the friction-based brake.

FIG. 3 shows a further variant of the arrangement according to FIG. 1. In the variant according to FIG. 3, the drive control device 10 is directly connected to the brake control device 80. A connection of this kind enables the drive control device 10 to transfer brake information B2 specifying the braking effect of the drive motor 30 in the presence of the emergency brake command SBF to the brake control device 80. The brake control device 80 therefore has the option of processing the brake information B2 of the drive control device 10 in addition to the brake information B of the monitoring device 70.

If the brake control device 80 determines that the two items of braking information B and B2 differ from each other by a predefined amount, it will preferably actuate the friction-based brake without taking into account the braking information B and B2, in other words, for example as if the drive motor 30 were inactive in terms of braking.

Figure 4:
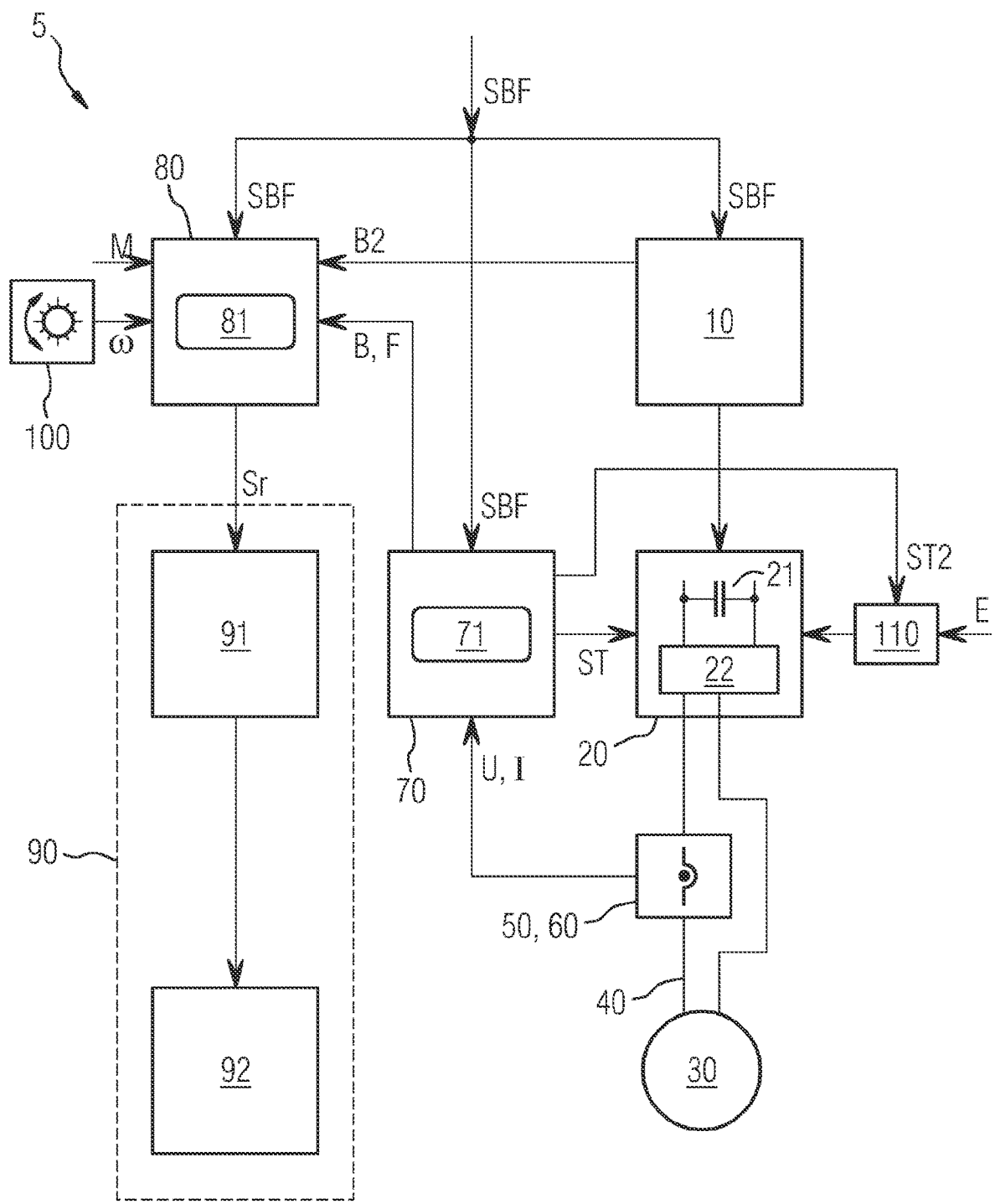
FIG. 4 shows components of an exemplary embodiment for an inventive rail vehicle, wherein the drive motor, in contrast to the exemplary embodiments according to FIGS. 1 to 3, has a one-phase and not a three-phase design.

FIG. 4 shows an exemplary embodiment for a rail vehicle 5 in which the drive motor 30 has a one-phase design. Accordingly, the supply lines 40 also have only a one-phase configuration, and only one current sensor 50, one voltage sensor 60 are provided to from a current measurement value I and a voltage measurement value U. Furthermore, the above statements apply in connection with FIGS. 1 to 3 accordingly.

In the exemplary embodiments according to FIGS. 1 to 4, the monitoring device 70 and the brake control device 80 are accommodated in separate units or pieces of equipment. Alternatively, they can also jointly form a single unit or be accommodated in one and the same unit. For example, the monitoring device 70 and the brake control device 80 can be formed by software modules, which are run by the same computing device.

Although the invention has been illustrated and described in detail by preferred exemplary embodiments it is not limited by the disclosed examples and a person skilled in the art can derive other variations herefrom without departing from the scope of the invention.

LIST OF REFERENCE CHARACTERS 5 rail vehicle
10 drive control device
20 power converter
21 direct voltage intermediate circuit
22 inverter
30 drive motor
40 supply lines
50 current sensors
60 voltage sensors
70 monitoring device
71 computing device
80 brake control device
81 computing device
90 brake
91 control unit
92 brake mechanism
100 speed sensor
110 switch
B braking information
B2 braking information
E energy supply
F fault signal
M load signal
I current measurement value
SBF emergency brake command
Sr control signal
ST switch-off signal
ST2 switch-off signal
U voltage measurement value
ω speed

The invention claimed is:

1. A vehicle, comprising:
at least one drive motor;
a brake control device; and
a monitoring device configured to measure, in a braking mode of the vehicle, at least one drive current flowing through said drive motor and at least one drive voltage applied to said drive motor, to form measurement values, and to generate operational information specifying a mode of operation of said drive motor on a basis of the measurement values.

2. The vehicle according to claim 1 being a rail vehicle.

3. The vehicle according to claim 1, wherein the operational information is braking information specifying a braking effect of said at least one drive motor.

4. The vehicle according to claim 3, wherein:
the vehicle has a friction-based brake;
said brake control device is configured for actuating said friction-based brake; and
said brake control device is configured to control said friction-based brake by taking into account the braking information of said monitoring device.

5. The vehicle according to claim 4, wherein said brake control device is configured, in the braking mode of the vehicle, to determine a required braking effect of the friction-based brake by calculating a difference between a predefined desired braking value and the braking information of the monitoring device and to generate a control signal for said friction-based brake on a basis of the required braking effect of said friction-based brake.

6. The vehicle according to claim 1, wherein:
said at least one drive motor is a two-phase or multi-phase drive motor; and
said monitoring device comprises a current sensor per each phase for measuring a phase current flowing through said drive motor to form a current measurement value, and a voltage sensor per each phase for measuring a phase voltage applied to said drive motor to form a voltage measurement value.

7. The vehicle according to claim 1, wherein:
said at least one drive motor is a three-phase drive motor; and
said monitoring device comprises three current sensors for measuring three current measurement values and three voltage sensors for measuring three voltage measurement values.

8. The vehicle according to claim 7, wherein said monitoring device is configured to add up the current measurement values to form a current sum and/or to add up the voltage measurement values to form a voltage sum.

9. The vehicle according to claim 8, wherein said monitoring device is configured to generate a fault signal when a value of the current sum exceeds a current-based threshold value and/or when a value of the voltage sum exceeds a voltage-based threshold value.

10. The vehicle according to claim 9, wherein said brake control device is configured, in the braking mode of the vehicle and in a presence of the fault signal, to actuate said friction-based brake without taking into account the braking information.

11. The vehicle according to claim 1, wherein said monitoring device is configured, in the braking mode, to switch off a drive current if the drive current flowing through the drive motor and the drive voltage applied to the drive motor indicate a traction mode of the drive.

12. The vehicle according to claim 1, wherein said monitoring device is configured, upon an issuance of an emergency brake command, to switch off a drive current if the drive current flowing through the drive motor and the drive voltage applied to the drive motor indicate a traction mode of the drive.

13. The vehicle according to claim 1, further comprising a drive control device and a power converter connected downstream of said drive control device and actuated by said drive control device, said power converter, in a driving mode, supplying the drive motor with driving energy and, in the braking mode of said drive motor, removing braking energy from said drive motor.

14. The vehicle according to claim 13, further comprising a switch connected between said power converter and an energy supply, and wherein:
said switch having a switched-on state connecting the energy supply with said power converter and a switched-off state separating the energy supply from said power converter;
said monitoring device is configured to switch off said switch if, in the braking mode of the vehicle, a fault signal is present and/or, in the presence of an emergency brake command, the measurement values indicate an active driving mode of said drive motor.

15. The vehicle according to claim 4, wherein the friction-based brake is an electropneumatic brake.

16. The vehicle according to claim 4, wherein the friction-based brake is configured for stepless actuation and/or for generating continuously adjustable braking force.

17. The vehicle according to claim 3, wherein said brake control device is connected to a drive control device and said brake control device is configured to process braking information determined by said drive control device in addition to the braking information of said monitoring device.

18. A method for braking a vehicle, which has at least one drive motor and at least one braking control device, the method comprising:
   in a braking mode of the vehicle, measuring at least one drive current flowing through the drive motor and at least one drive voltage applied to the drive motor to form measurement values; and
   generating operational information specifying a mode of operation of the drive motor on a basis of the measurement values.

19. The method according to claim 18, wherein the generating step comprises generating braking information specifying a braking effect of the drive motor.

20. The method according to claim 17, wherein the vehicle is a rail vehicle.

* * * * *